United States Patent [19]

Cheron et al.

[11] Patent Number: 5,275,461
[45] Date of Patent: Jan. 4, 1994

[54] TILT AND SLIDE ROOF WITH LINKS

[75] Inventors: Christian Cheron, Angers; Pierre Thierry, Cholet; Francois De Gaillard, Mouillron En Pareds, all of France

[73] Assignee: Webasto-Heuliez Limited Company, Les Chatelliers-Chateaumur, France

[21] Appl. No.: 915,428

[22] Filed: Jul. 17, 1992

[30] Foreign Application Priority Data

Jul. 19, 1991 [FR] France ................ 91 09151

[51] Int. Cl.⁵ .............................................. B60J 7/053
[52] U.S. Cl. .................................. 296/216; 296/220; 296/222; 296/223
[58] Field of Search .............. 296/216, 220, 222–224

[56] References Cited

U.S. PATENT DOCUMENTS

| | | | |
|---|---|---|---|
| 4,533,173 | 8/1985 | Davis et al. | 296/216 |
| 4,647,105 | 3/1987 | Pollard | 296/223 X |
| 5,058,947 | 10/1991 | Huyer | 296/216 |

FOREIGN PATENT DOCUMENTS

| | | | |
|---|---|---|---|
| 0187398 | 7/1986 | European Pat. Off. | |
| 2053086 | 6/1979 | Fed. Rep. of Germany | 296/216 |
| 3536184 | 11/1986 | Fed. Rep. of Germany | 296/220 |
| 2525159 | 10/1983 | France | |
| 2601303 | 1/1988 | France | |
| 0160319 | 7/1986 | Japan | 296/220 |
| 0211127 | 9/1986 | Japan | 296/216 |
| 0265020 | 11/1987 | Japan | 296/220 |
| 0063421 | 3/1989 | Japan | 296/220 |
| 2133750 | 8/1984 | United Kingdom | |

*Primary Examiner*—Dennis H. Pedder
*Attorney, Agent, or Firm*—Bachman & LaPointe

[57] ABSTRACT

An opening roof for automobile vehicles comprises a pair of rails, carriages mobile in longitudinal translation in the rails, a pair of slides carrying a panel adapted to close or uncover an opening in the roof of the vehicle, a pair of front links and a pair of rear links. The links are linked to the carriages by a rotation member and to the slides by members moving in guide paths formed in the thickness of the slides. Movement of the front links is desynchronized with respect to movement of the rear links to tilt the panel and slide it over the top of the roof.

6 Claims, 2 Drawing Sheets

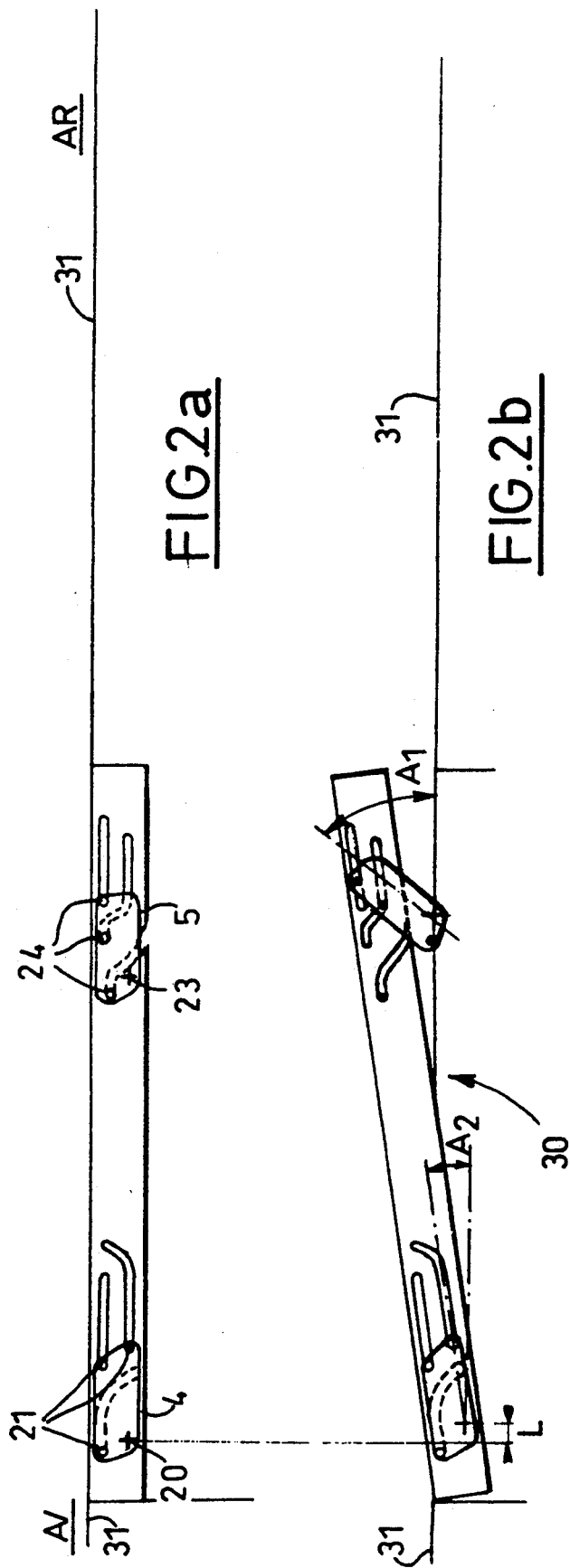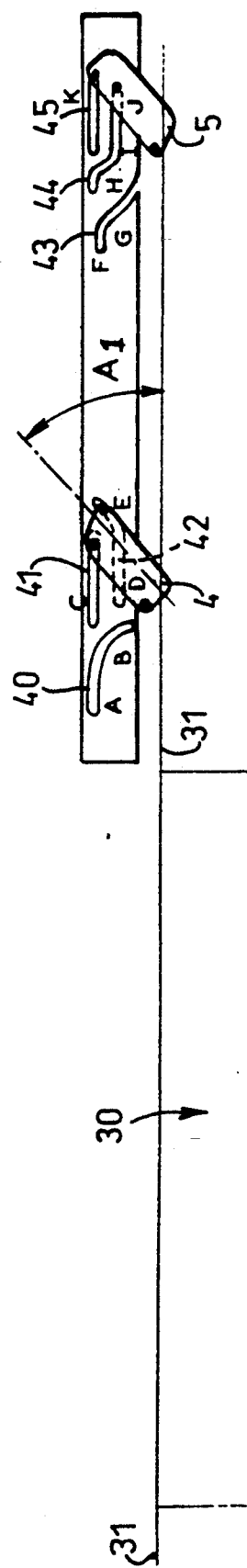

TILT AND SLIDE ROOF WITH LINKS

BACKGROUND OF THE INVENTION

Field of the Invention

The invention concerns opening roofs, in particular for automobile vehicles. It is routine practise to fit automobile vehicles having a roof with a roof opening and/or closing device called a sun-roof comprising a mobile panel articulated into an opening formed in the fixed surface of the roof. Roof opening and/or closing devices include devices in which the panel can be tilted and/or slid over the top of the roof so as not to reduce the interior roof height.

Known tilt and slide panel opening and/or closing devices usually comprise a pair of guide rails running along two opposite lateral sides of the opening, at least one pair of carriages disposed on each lateral side of the panel, the carriages being movable in longitudinal translation in the guide rails by a pair of cables, a pair of slides carrying the panel and each having a front part and rear part, the rear part of the slide being functionally linked to the carriages by a pair of rear links to be raised and/or lowered in a direction perpendicular to the fixed surface by pivoting of the rear links in a plane perpendicular to the fixed surface during initial displacement of the carriages.

To slide the panel across the top of the roof the guide rails are fixed to the top of the roof so that the panel is raised relative to the surface of the roof even with the roof closed. It is desirable to integrate the mobile panel and the guide rails into the thickness of the roof to obtain a roof surface with no discontinuities which increases the capacity for entry of air to the vehicle and reduces fuel consumption.

At present automobile vehicles are manufactured with a modular roof comprising two lateral strips along the two longitudinal sides of the roof in the form of grooves adapted to receive guide rails of a roof opening and/or closing device. The grooves are usually covered with removable plastics material seals.

The invention proposes a roof opening and/or closing device for vehicles equipped with a modular roof including an opening in which a tilt and slide panel moving over the top of the roof is integrated into the surface of the roof when the roof is closed.

SUMMARY OF THE INVENTION

The present invention consists in a roof opening and/or closing device, in particular for automobile vehicles, for uncovering and opening formed in a fixed surface of the roof by tilting and/or sliding of a panel over the fixed surface comprising a pair of guide rails running along two opposite lateral sides of the opening, at least one pair of carriages one on each lateral side of the panel, the carriages being mobile in longitudinal translation in the guide rails and moved in translation by a pair of cables, a pair of slides carrying the panel and each having a front part and a rear part, the rear part of these slides being functionally linked to the carriages by a pair of rear links to be raised and/or lowered in a direction perpendicular to the fixed surface by pivoting of the rear links in a plane perpendicular to the fixed surface during an initial displacement of the carriages, in which device the front part of the slides is functionally linked to the carriages by a pair of front links to be raised and/or lowered in the direction perpendicular to the fixed surface by pivoting of the front links in the plane perpendicular to the fixed surface, the pivoting of the front links being desynchronized with respect to the pivoting of the rear links so as to raise the rear part of the slides before the front part of the slides during the initial displacement of the carriages.

Other features and advantages of the invention will emerge more clearly from the following description with reference to the drawings.

BRIEF DESCRIPTION OF THE DRAWINGS

FIGS. 2a, 2b, 2c are diagrammatic representations of the roof opening and/or closing device showing the kinematics of the links in the panel closed, tilted and slid back positions.

DETAILED DESCRIPTION OF THE INVENTION

Figure 1:
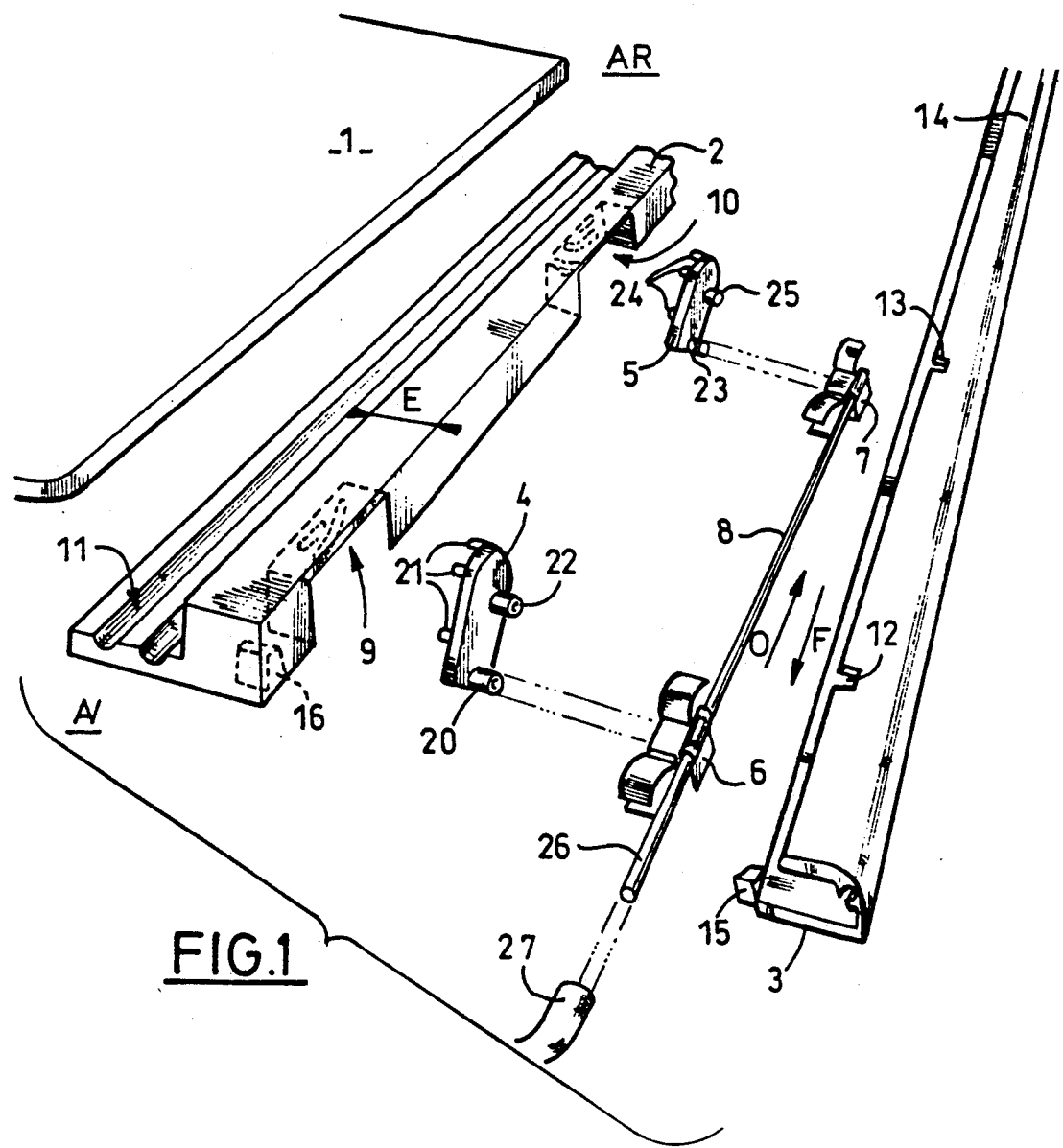
FIG. 1 is an exploded perspective view of part of a roof opening and/or closing device in accordance with the invention.

The same reference numbers denote the same components in all the figures. The roof opening and/or closing device is preferably mounted within the thickness of a roof 31 of an automobile vehicle. A substantially rectangular opening 30 is formed in the roof to receive a tilt and slide panel 1 which can move over the top of the roof as shown in FIGS. 2b and 2c. The modular roof is provided with grooves (not shown) to receive guide rails 3 running along the opposite lateral sides of the opening towards the rear of the roof. Each guide rail has a U-shape transverse cross-section, the two branches of the U-shape being adapted to guide carriages mobile in longitudinal translation known in themselves. A rail comprises two flanges forming the branches of the U-shape between which the carriages slide, the two flanges being joined together by a shaped wall incorporating a cable guide channel. The upper flange 14 of a rail is narrower than the flange below it so as to delimit within the roof a longitudinal passage at the level of each rail.

FIG. 1 is a diagrammatic exploded perspective view of the roof opening and/or closing device. Only a righthand part of the device is shown. The lefthand part is a mirror image of the righthand part. Apart from the pair of guide rails 3 the roof opening and/or closing device comprises a pair of front carriages 6 one on each side of the panel at the front thereof and a pair of rear carriages 7 one on each side of the panel at the rear thereof, a pair of slides 2 carrying the panel 1, a pair of front links 4 functionally linking the front part of the slides to the front carriages and a pair of rear links 5 functionally linking the rear part of the slides to the rear carriages. A front carriage 6 is linked to a rear carriage 7 by a cable 26, the front carriage 6 and the rear carriage 7 sliding together in the rail 3 running along the righthand lateral side of the opening. An identical combination of carriages and rails is disposed on the lefthand lateral side of the opening. A pair of front and rear carriages 6, 7 could be replaced with a single carriage. The two cables 26 operating the pairs of carriages 6, 7 are attached to a hand-operated or electrical cable operating mechanism, known in itself, through the intermediary of cable guides 27 to displace the pairs of carriages in the two opposite directions shown by the arrows.

The slides 2 have an L-shape transverse cross-section defining inner flanges 11 on which the lateral edges of the panel 1 are laid and fixed by adhesive bonding or like means. Each elongate slide has substantially the same longitudinal dimension as one lateral side of the panel. It comprises parallelepiped-shape recesses 9, 10 in its front part and in its rear part of thickness E. Front guide paths 40, 41, 42 in the form of grooves are formed in the recess 9 and rear guide paths 43, 44, 45 in the form of grooves are formed in the recess 10. The depth of the guide paths is adapted to receive and guide operating members 21, 24 as will be described later. In one embodiment of the invention the front guide paths comprise, in the direction from the front towards the rear of the slide, a first guide path 40, a second guide path 42 to the rear of the guide path 40 and a third guide path 41 substantially superposed on the guide path 42. In this same direction from the front towards the rear of the slide the rear guide paths comprises a fourth guide path 43, a fifth guide path 44 to the rear of the guide path 43 and a sixth guide path 45 substantially superposed on the guide path 44. The guide path 40 has a section A parallel to the longitudinal axis of the slide followed by a section B inclined downwardly towards the lower surface of the slide and whose end is open. The guide path 41 comprises a section C parallel to the longitudinal axis of the slide and at the same level as the section A. The guide path 42 comprises a section D parallel to the section C followed by a section E inclined upwardly towards the upper surface of the slide. The guide path 43 comprises a section F parallel to the longitudinal axis of the slide following by a section G inclined downwardly and whose end is open. The guide path 44 comprises a section H parallel to the section F followed by a section I inclined downwardly in turn followed by a section J parallel to the section H. The guide path 45 comprises a section K parallel to the section F or H.

Each substantially rectangular front and rear link 4, 5 is rotatably mounted on a front carriage 6 or rear carriage 7 respectively by means of a rotation member 20, 23 fixed to a first side of the link and which is inserted in a cylindrical hole (not shown) facing it formed in the thickness of each carriage. Operating members 21, 24 are fixed to the second side of each link 4, 5. In the embodiment shown in the figures each front link 4 or rear link 5 comprises three operating members each accommodated in a respective guide path. The disposition of the operating members 21, 24 on the second side of the links 4, 5 is adapted to the disposition of the guide paths in the slide so that movement of the operating members in the guide paths pivots the links in a plane perpendicular to the fixed surface 31 and according to kinematics determined by the profile of the guide path. In particular, the profile of the front guide paths 40, 41, 42 is different than the profile of the rear guide paths 43, 44, 45 in order to desynchronize the pivoting movement of the front link 4 relative to the pivoting movement of the rear link 5. As can be seen in FIG. 2c, the horizontal section A is longer than the horizontal sections F and H with the result that the rear link 5 pivots through a greater angle than the front link 4 during an initial displacement of the front and rear carriages 6, 7.

Each front and rear link 4, 5 has on its second side a locking member 22, 25 which projects towards the rail and which extends between the two flanges of the rail. The upper flange 14 of each rail comprises openings 12, 13 to allow the locking members 22, 25 to pass through when the panel 1 is slid across the top of the fixed surface 31 of the roof. In this position of the panel 1 the locking members 22, 25 are positioned on and move on the upper surface 14 of the rail 3.

The operation of the roof opening and/or closing device will now be described with reference to FIGS. 2a through 2c.

In the roof closed position the panel 1 is inset in the opening 3. The front and rear link$ 4, 5 are in a "lowered" position and the operating members 21, 24 are positioned at one end of the sections A, C, D, F, H, K. The links 4, 5 are entirely accommodated within the recesses 9, 10.

In the first direction of operation of the cables 26, shown by the arrow O, the front and rear carriages 6, 7 are simultaneously moved towards the rear in the rails 3 over a distance L representing the initial displacement and visible in FIG. 2b. During this initial displacement the operating members 21 move in the horizontal sections A, D, C and the operating members 24 move in the horizontal sections F, H, K before entering the inclined sections G, I. The horizontal sections F, H, K represent a "dead" travel of the cable to allow for the inertia of the cable drive system, which is an electric motor, for example. During the displacement of the operating members 2, 24 in the horizontal section A, D, C, F, H, K the links are not actuated and the panel 1 remains in the closed position. The entry of the operating members 24 into the inclined sections G, I causes the rear links 5 to pivot about the rotation member 23 and this raises the rear part of the slides. The longitudinal axis of a rear link is then at an angle A1 to the surface of the roof. The front links 4 pivot about the member 20 when the rear part of the slides is raised, the operating members 21 still moving in the horizontal sections A, C, D. The front part of the links remains "lowered", however; the longitudinal axis of a front link being at an angle A2 less than the angle A1 to the surface of the roof representing the angle by which the panel is tilted above the fixed surface of the roof. The travel of the panel 1 along the guide rails is locked by a locking system comprising, for example, a cut-out 16 in the lower surface of each slide engaged with a locking stud 15 fixed to the front end of the rails.

As the cables move further in the same direction the members 21 of the front links 4 enter the inclined sections B and E and the members 24 on the rear links 5 enter the horizontal sections J and K as can be seen in FIG. 2c. The front link 4 continues to pivot about the member 20, its longitudinal axis then being at an angle A1 to the surface of the roof, and the rear link 5 remains in its "raised" position, which raises the front part of the slide and therefore lifts the entire panel vertically above the opening. As the cables continue to move in the same direction the members 21 and 24 reach the ends of the sections C, E, J, K which causes the panel to slide across the top of the fixed surface of the roof. The vertical lifting of the panel 1 disengages the cut-out 16 from the stud 15 and positions the locking members 22, 25 on the top of the upper surfaces 14 of the rails. In the slid back position of the panel the links 4, 5 have one end facing the interior of the rails and the other end above the rails, their central part passing through the rail crossings defined by the upper flanges 14 of the rails.

From the position where it is completely disengaged from the opening, the panel can be returned to the position raised over the opening, then tilted and finally lowered into the roof closed position by moving the cables 26 in the opposite direction shown by the arrow F.

The invention is not limited to the embodiment described above and variants thereof may be put forward without departing from the scope of the invention.

There is claimed:

1. Roof opening and/or closing device for uncovering an opening formed in a fixed surface of a roof by at least one of tilting and sliding a panel over the fixed surface, the device comprising:

two guide rails;
- a first one of said guide rails running along a first lateral side of the opening and a second one of said guide rails running along a second lateral side of the opening;
- first carriage means arranged on a first one of said lateral sides, said first carriage means being movable in longitudinal translation in said first one of said guide rails;
- second carriage means arranged on a second one of said lateral sides, said second carriage means being movable in longitudinal translation in said second one of said guide rails;
- cable means for causing movement of said first and second carriage means;
- said panel being carried by two slides;
- each of said slides having a front part and a rear part;
- the rear parts of said slides being functionally linked to said first and second carriage means by a pair of rear links to be raised and/or lowered in a direction perpendicular to the fixed surface by pivoting of the rear links in a plane perpendicular to the fixed surface during an initial displacement of the first and second carriage means;
- the front parts of said slides being functionally linked to said first and second carriage means by a pair of front links to be raised and/or lowered in the direction perpendicular to the fixed surface by pivoting of the front links in the plane perpendicular to the fixed surface;
- each of said front and rear links having a fixed, laterally extending rotation member for joining a respective one of said links to one of said first and second carriage means, said rotation member fitting into a hole in said one of said first and second carriage means; and
- means associated with said slides for causing the pivoting of the front links to be desynchronized with respect to the pivoting of the rear links and so as to raise the rear parts of the slides before the front parts of the slides during the initial displacement of the first and second carriage means; and
- said means associated with said slides for causing pivoting of the front links to be desynchronized with respect to the pivoting of the rear links comprising a set of operating members carried by each of said front and rear links and guide paths formed in the front and rear parts of each of said slides.

2. Device according to claim 1 wherein the guide paths in the front part of each said slide have different profiles than the guide paths int he rear part of each said slide in order to desynchronize the pivoting of the front links relative to the pivoting of the rear links during the initial displacement of the first and second carriage means.

3. Device according to claim 1 wherein said panel has a rear part and the front and rear links raise at least the rear part of the panel above the fixed surface.

4. Device according to claim 3 wherein the front and rear links lift all of the panel above the fixed surface.

5. Device according to claim 4 wherein the front and rear links acting in concert with said slides and said first and second carriage means enable the panel to slide as a whole over the fixed surface.

6. Device according to claim 1 wherein:
- said first carriage means comprises first and second carriages;
- said first carriage being joined to a first one of said front links and said second carriage being joined to a first one of said rear links;
- said second carriage means comprises third and fourth carriages; and
- said third carriage being joined to a second one of said front links and said fourth carriage being joined to a second one of said rear links.

* * * * *